United States Patent [19]

Mitarai et al.

[11] Patent Number: 4,688,173
[45] Date of Patent: Aug. 18, 1987

[54] PROGRAM MODIFICATION SYSTEM IN AN ELECTRONIC CASH REGISTER

[75] Inventors: Akira Mitarai, Yamatokoriyama; Kunio Kubota, Nara, both of Japan

[73] Assignee: Sharp Kabushiki Kaisha, Osaka, Japan

[21] Appl. No.: 487,667

[22] Filed: Apr. 22, 1983

[30] Foreign Application Priority Data

| Apr. 26, 1982 | [JP] | Japan | 57-70837 |
| Apr. 27, 1982 | [JP] | Japan | 57-72301 |
| Apr. 28, 1982 | [JP] | Japan | 57-71894 |
| Apr. 29, 1982 | [JP] | Japan | 57-71684 |
| May 7, 1982 | [JP] | Japan | 57-77124 |
| May 8, 1982 | [JP] | Japan | 57-77306 |

[51] Int. Cl.⁴ .................. G06F 13/00; G06F 11/00
[52] U.S. Cl. .................. 364/405; 364/200; 364/900
[58] Field of Search ............ 364/404, 405, 406, 200, 364/900

[56] References Cited

U.S. PATENT DOCUMENTS

| T977,007 | 12/1978 | Selarder | 364/474 |
| 3,748,452 | 7/1973 | Ruben | 364/405 X |
| 3,911,406 | 10/1975 | McLaughlin et al. | 364/200 |
| 3,936,182 | 2/1976 | Sheikh | 364/900 X |
| 4,001,568 | 1/1977 | Iizuka et al. | 364/406 X |
| 4,095,738 | 6/1978 | Masuo | 364/405 X |
| 4,121,196 | 10/1978 | Johnson et al. | 364/900 |
| 4,142,246 | 2/1979 | Fumihiko | 364/900 |
| 4,150,428 | 4/1979 | Lurig et al. | 364/200 |
| 4,218,757 | 8/1980 | Drogichen | 364/900 |
| 4,429,367 | 1/1984 | Ikeda | 364/513 |
| 4,455,619 | 6/1984 | Masui et al. | 364/900 |
| 4,458,317 | 7/1984 | Horigome et al. | 364/405 X |
| 4,542,453 | 9/1985 | Patrick et al. | 364/200 |

FOREIGN PATENT DOCUMENTS

| 1346219 | 2/1974 | United Kingdom . |
| 2043308 | 10/1980 | United Kingdom . |

Primary Examiner—Jerry Smith
Assistant Examiner—Charles B. Meyer
Attorney, Agent, or Firm—Birch, Stewart, Kolasch & Birch

[57] ABSTRACT

An electronic cash register includes a mask ROM for memorizing a fixed operation program. First through third RAM's are provided for storing information for partly modifying the operation program memorized in the mask ROM. The first RAM stores information which indicates an address of the mask ROM at which the program should be modified. The second RAM stores a modified program. The third RAM stores an address table which correlates the address of the mask ROM at which the address should be modified, and the addresses of the second RAM at which the modified program is stored. A control system performs an operation in accordance with the operation program memorized in the mask ROM with reference to the first RAM. When the first RAM indicates the modification, the operation is conducted in accordance with the modified program information and associated address table stored in the second and third RAM's.

7 Claims, 6 Drawing Figures

PROGRAM MODIFICATION SYSTEM IN AN ELECTRONIC CASH REGISTER

BACKGROUND AND SUMMARY OF THE INVENTION

The present invention relates to an electronic apparatus such an an electronic cash register and a teller machine. The present invention relates, more particularly, to a program modification system for modifying a part of a program memorized in a program memory included in the electronic apparatus.

Generally, in an electronic apparatus such as an electronic cash register, a system control program is memorized in a mask ROM. When the program has been written into the mask ROM, it can not be changed and, therefore, the system operation program can not be changed or modified without exchanging the mask ROM.

Accordingly, an object of the present invention is to provide a program modification system for modifying a part of an operation program memorized in an electronic apparatus.

Another object of the present invention is to provide an electronic cash register, wherein a part of an operation program can be modified without exchanging a read only memory which stores the operation program.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an operation program is memorized in a mask ROM. A first RAM is provided which has the same addresses as the mask ROM in order to store information indicating whether the program of the respective address should be changed or not. A second RAM is provided for storing a modification program, the second RAM having addresses different from the mask ROM. A third RAM is provided for storing the mask ROM address of which program should be changed, and for storing the address of the second RAM which stores the modified operation program. The system operation is controlled by the operation program memorized in the mask ROM and the modification information stored in the first, second and third RAM's.

In a preferred form, a backup battery is provided for supplying power to the second and third RAM's in order to maintain the modification information even when the main power switch is switched off.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
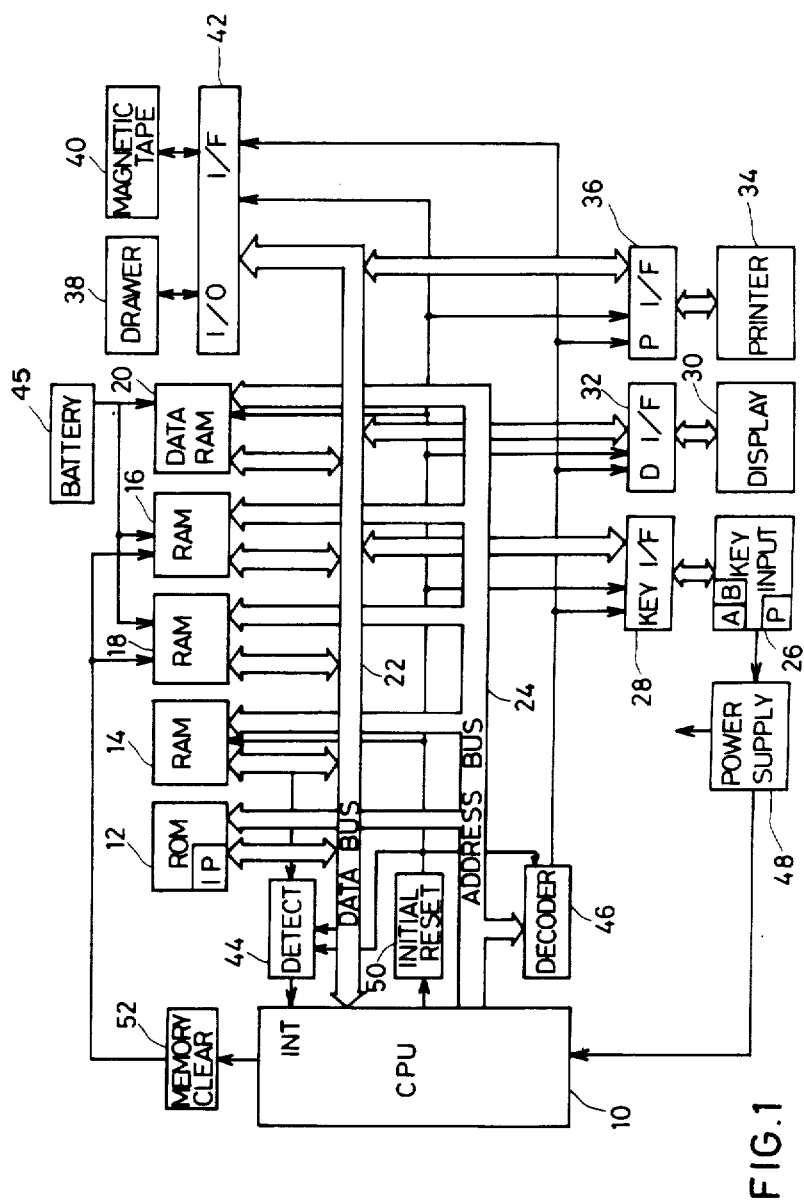
FIG. 1 is a block diagram of an embodiment of an electronic cash register of the present invention.

An embodiment of an electronic cash register of the present invention includes a central processor unit (CPU) 10 for controlling the system operation. A mask read only memory (ROM) 12 is provided for memorizing a fixed operation program according to which the system operation is conducted. A first random access memory (RAM) 14 is provided, which has the same addresses as the mask ROM 12, whereby the first RAM 14 stores information which represents the requirements of the program modification with respect to each address of the mask ROM 12. A second random access memory (RAM) 16 has addresses different from those of the mask ROM 12, and functions to store a modified program. A third random access memory (RAM) 18 stores the address information which represents an address of the mask ROM 12 of which program should be modified, and the address information which represents an address of the second RAM 16 which stores the modified program. The transaction data registered into the electronic cash register is memorized in a fourth random access memory (RAM) 20.

The CPU 10 is communicated with the mask ROM 12, the first through fourth RAM's 14, 16, 18 and 20 via a data bus 22 and an address bus 24. The CPU 10 is further connected to a keyboard panel 26 via a key interface 28. The keyboard panel 26 includes numeral keys and function keys for conducting the registering operation. The keyboard panel 26 further includes a main power switch P for controlling the main power supply, an initial reset setting key A, a memory clear key B, and mode selection keys for selectively placing the electronic cash register in the normal registering mode, the checking mode and the read mode. The electronic cash register of FIG. 1 further includes a display panel 30 for displaying the transaction data, a display interface 32, a printer 34 for printing out the transaction data onto a receipt slip or a journal paper, and a printer interface 36. A drawer 38 is provided for containing money. A magnetic tape 40 is connectable to the data bus 22 via an input/output interface 42 for introducing the modified program into the second RAM 16. A backup battery 45 is connected to the second, third and fourth RAM's 16, 18 and 20 for maintaining the program and data stored in the second, third and fourth RAM's 16, 18 and 20.

A detection circuit 44 comprising a flip-flop is provided for detecting the address of which program should be modified. The flip-flop is set when a code signal "1" is developed from the first RAM 14. The set output of the detection circuit 44 is applied to the CPU 10 for conducting the interrupt operation. The flip-flop is reset by a control signal developed from the CPU 10 which develops the control signal in response to the last step of the modified program stored in the second RAM 16. A decoder 46 is provided for decoding the address information transferred on the address bus 24.

Figure 5:
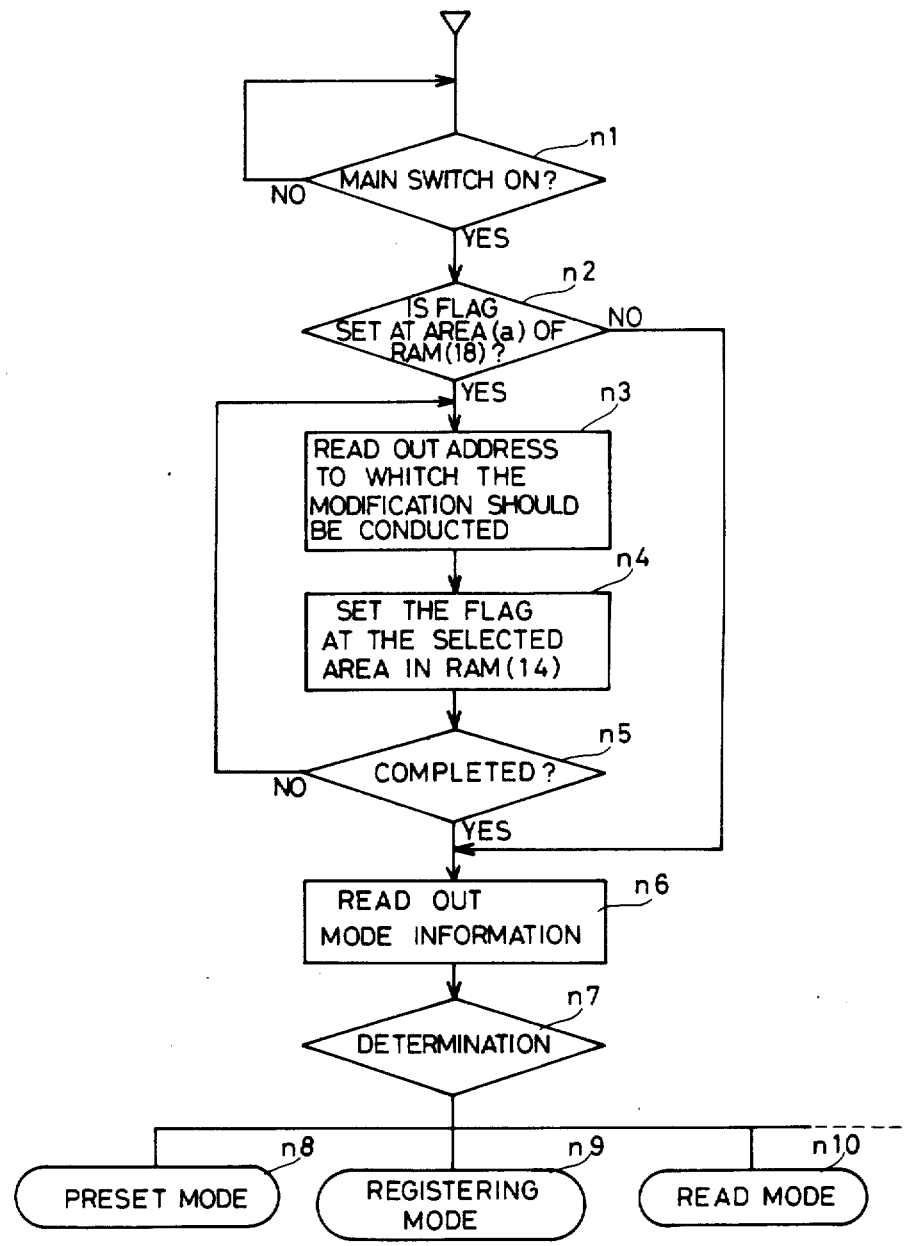
FIGS. 5 and 6 are flow charts for explaining an operational mode of the electronic cash register of FIG. 1.

A power supply circuit 48 is associated with the main power switch P for supplying the power to the entire system. When the main power switch P is switched on, the power supply circuit 48 develops a switching-on detection signal towards the CPU 10. The mask ROM 12 includes an initial program region IP which is selected when the switching-on detection signal is developed from the power supply circuit 48. An operation related to the initial reset will be described later with reference to FIG. 5. An initial reset circuit 50 is provided for conducting the initial reset operation onto the fourth RAM 20, the keyboard panel 26, the display panel 30, the printer 34, and the interfaces 28, 32, 36 and 42. A memory clear circuit 52 is provided for clearing the information stored in the second and third RAM's 16 and 18.

An operational mode of the electronic cash register of FIG. 1 will be described with reference to FIGS. 2 through 6.

When the fixed program memorized in the mask ROM 12 is desired to be modified, the magnetic tape 40 is connected to the input-/output interface 42, whereby the modification program is introduced into and stored in the second RAM 16, and the address data which indicates the address of the mask ROM 12 of which program should be changed and indicates the address of the second RAM 16 to which the modified program is introduced into and stored in the third RAM 18.

Figure 2:
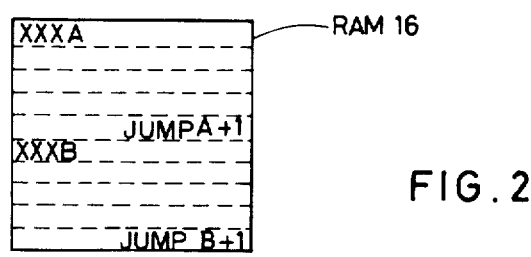
FIG. 2 is a schematic chart for explaining a memory condition of a second RAM (16) included in the electronic cash register of FIG. 1.
Figure 3:
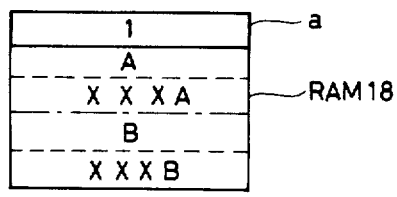
FIG. 3 is a schematic chart for explaining a memory condition of a third RAM (18) included in the electronic cash register of FIG. 1.

More specifically, when the program stored at the addresses A and B of the mask ROM 12 is desired to be changed, the first modification program (for modifying the program of the address A) is introduced into the second RAM 16 and stored after the address XXXA. The last step of the first modification program includes a command for jumping the operation to the program of the address A+1 in the mask ROM 12 as shown in FIG. 2. Furthermore, the second modification program (for modifying the program of the address B) is introduced into the second RAM 16 and stored after the address XXXB. The last step of the second modification program includes a command for jumping the operation to the program of the address B+1 in the mask ROM 12 as shown in FIG. 2. Moreover, the flag "1" is set at the first address area a of the third RAM 18 as shown in FIG. 3. Then, the third RAM 18 memorizes a table which indicates the address of the mask ROM 12 of which program should be changed, and the address of the second RAM 16 to which the modified program has been introduced. The flag "1" set at the first address area a of the third RAM 18 indicates that a part of the program memorized in the mask ROM 12 should be changed.

Under these conditions, when the main power switch P included in the keyboard panel 26 is switched on to conduct the registering operation, the power supply circuit 48 develops the switching-on detection signal. In response thereto, the CPU 10 selects the initial operation program stored at the initial program region IP of the mask ROM 12, thereby conducting the operation shown in FIG. 5.

Figure 4:
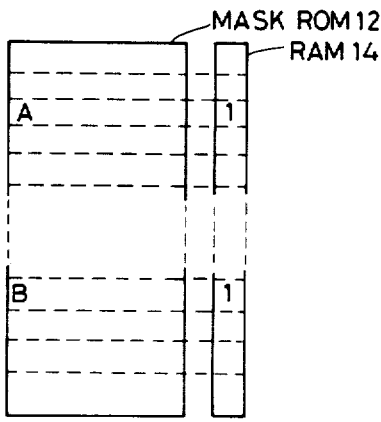
FIG. 4 is a schematic chart for explaining a memory condition of a mask ROM (12) and a first RAM (14) included in the electronic cash register of FIG. 1.

The CPU 10 first detects the switching-on operation at the step n1. Then, a determination is carried out to detect whether the flag "1" is set at the area a of the third RAM 18 (step n2). If the flag "1" is set at the area a of the third RAM 18, the operation is advanced to the step n3, wherein the program address of the mask ROM 12 of which the program should be changed is read out, and a flag "1" is set in the first RAM 14 at the corresponding address (step n4). In this example, the flag "1" is set at the addresses A and B of the first RAM 14 as shown in FIG. 4. When the flag setting operation is completed, the operation is advanced to the following steps n6 and n7 via a step n5. More specifically, the CPU 10 reads out the mode information selected by the mode selection keys included in the keyboard panel 26. If the registering mode key is actuated, the operation is conducted in accordance with the normal registering operation program stored in the mask ROM 12 (step n9). If the flag "1" is not set at the first address area a of the third RAM 18, the operation is advanced from the step n2 to the step n6. That is, no flag is set in the first RAM 14.

Figure 6:
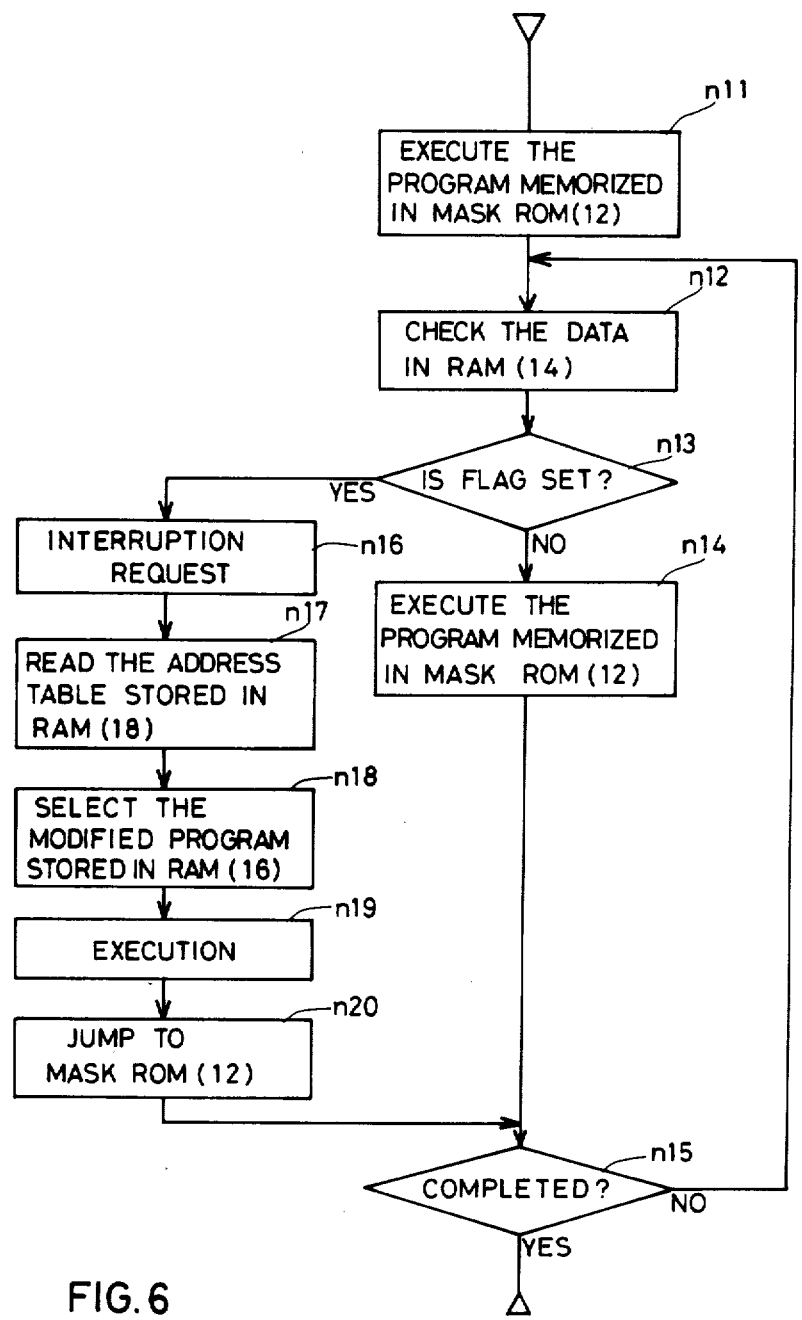

After the initial operation program is completed, the operation is conducted in accordance with the program memorized in the mask ROM 12 as shown in FIG. 6. The CPU 10 sequentially selects the addresses of the mask ROM 12 for reading out the program memorized in the mask ROM 12 (steps n11 and n12). At the same time, the corresponding addresses of the first RAM 14 are selected and read out. When the corresponding address of the first RAM 14 does not have the flag "1", the detection circuit 44 is in the reset state and, therefore, the operation is conducted in accordance with the program memorized in the mask ROM 12 (steps n13 and n14). When the operation is advanced to the address A of the mask ROM 12, the corresponding address of the first RAM 14 stores the set flag "1". Accordingly, the detection circuit 44 is set to develop the interruption requirement to the CPU 10 (steps n13 and n16).

In response to the thus developed interruption requirement, the CPU 10 temporarily memorizes the present address A, and goes to see the address table stored in the third RAM 18. That is, the CPU 10 recognizes that the modified program is stored from the address XXXA of the second RAM 16 (step n17). Then, the operation is jumped to the address XXXA of the second RAM 16 to execute the modified program stored in the second RAM 16 (steps n18 and n19). At the end of the modified program, the jump command to the mask ROM program is provided. That is, the detection circuit 44 is reset, and the operation is returned to the address A+1 of the mask ROM 12 (step n20).

Similarly, when the operation is advanced to the address B of the mask ROM 12, the detection circuit 44 is set to develop the interruption requirement. The CPU 10 selects the address XXXB of the second RAM 16 to execute the modified program stored from the address XXXB of the second RAM 16. In a preferred form, the first through fourth RAM's 14, 16, 18 and 20 are implemented with the C-MOS RAM's. One bit of the first RAM 14 corresponds to one bite of the mask ROM 12.

When the operator wishes to correct the transaction data registered in the fourth RAM 20, the main power switch P is actuated under the condition where the initial reset setting key A is depressed. In response thereto, the CPU 10 applies the initial reset command to the initial reset circuit 50 for conducting the resetting operation of the respective memories. However, please note that it is not preferable if the modified program information stored in the second and third RAM's 16 and 18 is cleared by this resetting operation. In accordance with the present invention, the initial resetting operation is not conducted to the second and third RAM's 16 and 18. Instead, the memory clear circuit 52 is provided for clearing the program information stored in the second and third RAM's 16 and 18. In order to clear the program information stored in the second and third RAM's 16 and 18, the main power switch P is switched on under the condition where the memory clear key B is depressed. In response thereto, the CPU 10 activates the memory clear circuit 52 to clear the program information stored in the second and third RAM's 16 and 18.

In the foregoing embodiment, the program information is introduced from the magnetic tape 40. The program modification information can alternatively be introduced from the keyboard panel 26 through the manual operation as is well known in the field of the programmable electronic calculator.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A program modification system in an electronic cash register comprising:
   first memory means having a plurality of addresses for permanently memorizing a fixed operation program which controls an operation of the electronic cash register according to said fixed operation program associated with each of said plurality of addresses;
   second memory means, having the same plurality of addresses as said first memory means, for storing modification instructions at each respective address for which a program modification should be conducted at each of the corresponding addresses of the fixed operation program memorized in said first memory means;
   third memory means, having different addresses from said first memory means, for storing a modification program;
   fourth memory means for storing an address table corresponding to the addresses of said first memory means and for storing the addresses of said third memory means having respective ones of said modification programs;
   control means for executing a modified operation program which controls an operation of the electronic cash register, said modified operation program including a combination of steps of the fixed program in said first memory means and the modification program in said third memory means by introducing modification instructions from the modification program in said third memory means to addresses in said fourth memory means corresponding to said address table, to enable said control means to execute modification instructions in said second memory means on said fixed program at corresponding addresses in said first memory means;
   a main power supply switch for supplying electric power to the electronic cash register; and
   backup battery means for supplying electric power to said third and fourth memory means when said main power supply switch is switched off, thereby maintaining the modification program and associated address table stored in said third and fourth memory means when said main power supply switch is switched off;
   said control means including an initial control system for transferring said modification instructions into said second memory means in response to a switching-on operation of said main power supply switch and in accordance with the modification program and associated address table stored in said third and fourth memory means, respectively.

2. The program modification system in an electronic cash register of claim 1, further comprising:
   an input/output interface which connects the electronic cash register to a magnetic tape system, whereby said modification program and associated address table is introduced from said magnetic tape system into said third and fourth memory means.

3. The program modification system in an electronic cash register of claim 1, further comprising:
   a keyboard panel for manually introducing the modification program and associated address table into said third and fourth memory means.

4. The program modification system of claim 1, wherein
   said first memory means comprises a mask read only memory (ROM); and
   said second, third and fourth memory means comprise C-MOS random access memories (RAM).

5. The program modification system in an electronic cash register of claim 1, wherein
   one bite of said second memory means is assigned to store data which corresponds to one bite of information of said first memory means.

6. The program modification system in an electronic cash register of claim 1, further comprising:
   an initial reset system for initially resetting said second memory means when said main power supply switch is switched on; and
   inhibition means for protecting said third and fourth memory means from the initial resetting operation conducted by said initial reset system.

7. The program modification system in an electronic cash register of claim 6, further comprising:
   a memory clear system for clearing the modified program information and associated address table stored in said third and fourth memory means.

* * * * *